(12) United States Patent
Castner et al.

(10) Patent No.: US 11,560,462 B1
(45) Date of Patent: Jan. 24, 2023

(54) FUNCTIONALIZED HIGH CIS-1,4-POLYBUTADIENE

(71) Applicant: THE GOODYEAR TIRE & RUBBER COMPANY, Akron, OH (US)

(72) Inventors: Eric Sean Castner, Uniontown, OH (US); Michael Lawrence Gersman, Cleveland, OH (US); Bruce Raymond Hahn, Hudson, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 17/025,286

(22) Filed: Sep. 18, 2020

Related U.S. Application Data

(60) Provisional application No. 62/903,122, filed on Sep. 20, 2019.

(51) Int. Cl.
*C08K 5/098* (2006.01)
*C08K 3/22* (2006.01)
*A63B 37/00* (2006.01)
*B60C 1/00* (2006.01)

(52) U.S. Cl.
CPC .......... *C08K 5/098* (2013.01); *A63B 37/0074* (2013.01); *C08K 3/22* (2013.01); *A63B 2209/00* (2013.01); *B60C 2001/0058* (2013.01); *C08K 2003/2296* (2013.01)

(58) Field of Classification Search
CPC ....................................... A63B 37/005–00691
See application file for complete search history.

(56) References Cited

U.S. PATENT DOCUMENTS

| 3,163,683 | A | 12/1964 | Salyer et al. |
| 4,056,269 | A | 11/1977 | Pollitt et al. |
| 4,227,563 | A | 10/1980 | Grosch et al. |
| 4,260,707 | A | 4/1981 | Witte et al. |
| 4,264,075 | A | 4/1981 | Miller et al. |
| 4,319,943 | A | 3/1982 | Bayuga |
| 4,444,903 | A | 4/1984 | Carbonaro et al. |
| 4,461,883 | A | 7/1984 | Takeuchi et al. |
| 4,533,711 | A | 8/1985 | Takeuchi |
| 4,650,193 | A | 3/1987 | Molitor |
| 4,852,884 | A | 8/1989 | Sullivan |

(Continued)

FOREIGN PATENT DOCUMENTS

CA 1284545 5/1991

*Primary Examiner* — Eugene L Kim
*Assistant Examiner* — Matthew B Stanczak
(74) *Attorney, Agent, or Firm* — Alvin T. Rockhill

(57) ABSTRACT

It has been found that carboxylic acid functionalized high cis-1,4-polybutadiene rubber which is comprised of polybutadiene rubber chains having a cis-1,4-microstructure content of at least 90 percent has much better interaction with metal salts of $\alpha,\beta$-ethylenically unsaturated carboxylic acids, such as zinc diacrylate or zinc dimethacrylate. This results in such rubber compositions being stiff while still exhibiting a lower level of hysteresis. These characteristics are beneficial when used in manufacturing tire apex compositions, in manufacturing golf ball cores, and in a wide variety of other applications. Such rubber compositions can be used as substitutes for thermoplastic elastomers in many applications.

20 Claims, 1 Drawing Sheet

(56) References Cited

U.S. PATENT DOCUMENTS

| | | |
|---|---|---|
| 4,934,431 A | 6/1990 | Agari et al. |
| 4,983,695 A | 1/1991 | Kuzma et al. |
| 5,221,385 A | 6/1993 | Hanada et al. |
| 5,252,652 A | 10/1993 | Egashira et al. |
| 5,309,971 A | 5/1994 | Baker et al. |
| 5,374,324 A | 10/1994 | Vinson et al. |
| 5,451,646 A | 9/1995 | Castner |
| 5,697,856 A | 12/1997 | Moriyama et al. |
| 5,698,643 A | 12/1997 | Donbar et al. |
| 5,711,723 A | 1/1998 | Hiraoka et al. |
| 5,776,012 A | 7/1998 | Moriyama et al. |
| 5,919,101 A | 7/1999 | Yokota et al. |
| 6,162,135 A | 12/2000 | Bulpett et al. |
| 6,184,301 B1 | 2/2001 | Shindo et al. |
| 6,287,218 B1 | 9/2001 | Ohama |
| 6,291,592 B1 | 9/2001 | Bulpett et al. |
| 6,365,668 B1 * | 4/2002 | Scholl .................. C08C 19/20 524/575 |
| 6,635,716 B2 | 10/2003 | Voorheis et al. |
| 6,666,780 B2 | 12/2003 | Watanabe |
| 6,679,791 B2 | 1/2004 | Watanabe |
| 6,713,565 B2 | 3/2004 | Burkhart et al. |
| 6,972,061 B1 | 12/2005 | Kubinski et al. |
| 8,973,637 B2 | 3/2015 | Van Riper |
| 2001/0031821 A1 * | 10/2001 | Scholl .................. C08L 71/02 524/492 |
| 2002/0137849 A1 | 9/2002 | Kerns et al. |
| 2006/0281586 A1 * | 12/2006 | Sullivan ............. A63B 37/0037 473/371 |
| 2008/0261722 A1 * | 10/2008 | Bulpett .................. C08K 5/37 473/372 |
| 2010/0218864 A1 * | 9/2010 | Takaku .................. C08K 3/04 152/157 |
| 2011/0003932 A1 * | 1/2011 | Steinhauser ............. C08L 9/00 524/571 |
| 2012/0172491 A1 * | 7/2012 | Miyazaki ............. B60C 1/0016 523/157 |
| 2014/0051799 A1 * | 2/2014 | Morita .................. C08K 3/36 524/572 |
| 2014/0187696 A1 * | 7/2014 | Cheng .................. C08K 5/134 524/291 |
| 2014/0213391 A1 * | 7/2014 | Shindo ............... A63B 37/0074 473/372 |
| 2014/0357406 A1 * | 12/2014 | Shindo .................. C08K 5/098 473/371 |
| 2017/0121524 A1 * | 5/2017 | Tanaka ............. A63B 37/00622 |
| 2017/0165527 A1 * | 6/2017 | Inoue ................ C08G 18/6677 |
| 2017/0173399 A1 * | 6/2017 | Tajima ............... C08G 18/7664 |
| 2018/0154693 A1 * | 6/2018 | Homma .................. B60C 9/02 |
| 2020/0231815 A1 * | 7/2020 | Matsuyoshi ........... C08F 212/08 |

\* cited by examiner

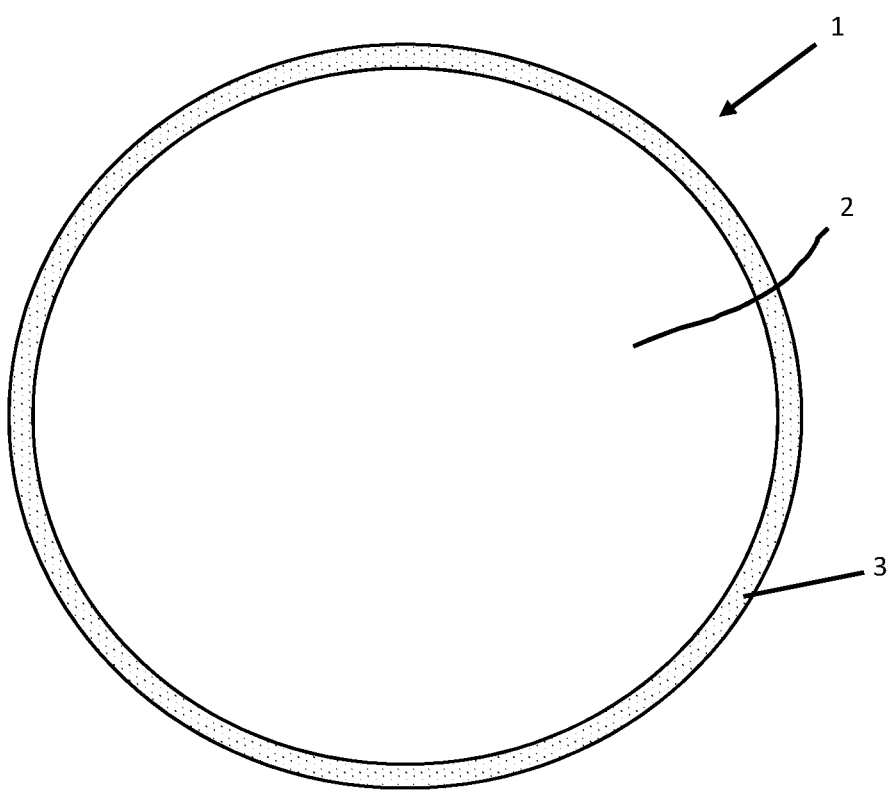

FUNCTIONALIZED HIGH CIS-1,4-POLYBUTADIENE

This application claims benefit of U.S. Provisional Patent Application Ser. No. 62/903,122, filed on Sep. 20, 2019. The teachings of U.S. Provisional Patent Application Ser. No. 62/903,122 are incorporated herein by reference in their entirety.

FIELD OF THE INVENTION

This invention relates to the functionalization of high cis-1,4-polybutadiene rubber to improve its compatibility with zinc diacrylate to attain a high level of stiffness and a lower level of hysteresis. Such high cis-1,4-polybutadiene rubbers which are filled with a metal salt of an $\alpha,\beta$-ethylenically unsaturated carboxylic acids, such as zinc diacrylate or zinc dimethacrylate are particularly valuable for used in tire apex formulations, golf ball core formulations, and a wide variety of other applications where a high level of stiffness and a low level of hysteresis is desired.

BACKGROUND OF THE INVENTION

High cis-1,4-polybutadiene rubber is a synthetic rubber that is used extensively in manufacturing various rubber products. For instance, high cis-1,4-polybutadiene rubber is utilized in large quantities in tire tread rubber to attain better tread wear characteristics and better fuel economy. It is also broadly used in other tire components, such as in the apex of tires. High cis-1,4-polybutadiene rubber is also used in manufacturing a variety of other products, for instance it is utilized extensively in the core of premium golf balls.

A conventional radial-ply tire includes radial plies that are wrapped around two annular inextensible beads. In the tire making process, a green tire carcass ("green" meaning as yet uncured and still tacky) is built by sliding a green innerliner and radial ply over a tire "building drum" (or "building mandrel"). Two beads (each comprising a cable of steel filaments encased in green rubber) are then slid over the carcass, one at each side. The portions of the plies that extend beyond the beads are then turned up around the beads, forming "turn-ups". Then, the portion of the plies between the beads is expanded radially outward so as to contact the ply turn-ups. The annular cross-sectionally triangular rubber filler bounded by the turned up ply and the bead is called an "apex".

In tire manufacturing there are two widely used methods of incorporating the apex into the tire structure. In the "pre-apexing" method, an apexing machine adheres an annular triangular apex to an annular bead. The bead, with the apex still adhering to it, is slid over the carcass on the building drum. The plies are then turned up and expanded as mentioned above, so that the apex is surrounded by the bead from below and by the plies from the sides.

In the "flat application of apex" method, the apex is circumferentially laid down onto the carcass while on the building drum. The apex is laid down as a triangular strip of green rubber ("gum strip") lying horizontally on the carcass, next to the bead, so that one of its tacky long flat sides adheres to the tacky green carcass, and its short base is close to, and faces, the bead. When the portion of the plies between the beads is expanded outward, the apex's wedge profile swings around 90 degrees, and rests atop the bead, aligned vertically.

The choice of triangular dimensions and material properties of the apex affects the performance of the tire, such as tire weight, sidewall stiffness, handling, ride comfort, flexural heat, material fatigue, and tire life. For example, since the apex extends up much of the length of the sidewall, increasing the stiffness of the apex increases the stiffness of the sidewall, yielding less sidewall flexing and hence less flexural heat and material fatigue, but at the cost of a rougher ride. Increasing the apex's radial length (so that it travels farther up the sidewall) further stiffens the sidewall and improves handling, which is beneficial for "high performance" tires.

Bead assemblies having a multilayered apex, a rubber material adjacent to an apex, or a flat rubber material between the bead and ply are described in the prior art. More specifically, U.S. Pat. No. 4,319,943 discloses a method of securing a bead filler material to a bead by positioning "bead filler portions" (apex) on top of "reinforce material" (plies) on either side of the bead bundle, and folding the reinforce material around the bead bundle. U.S. Pat. No. 4,934,431 discloses a bead filler (apex) disposed above a ring of bead wire and a bead reinforcing layer disposed within the folded portion of the carcass and extending about the bead wire wherein the reinforcing layer may be composed of cords of carbon fiber with a rubber latex adhesive. U.S. Pat. No. 4,227,563 discloses a tire in which "a first filler element is provided to separate the turnup from both the apex strip and the carcass ply and which also has second and third filler elements. U.S. Pat. No. 5,374,324 discloses an apex of triangular cross-section formed of multiple apex leafs radially contacting each other. U.S. Pat. No. 5,309,971 discloses a bead assembly having a rubber bead filler (apex) and a reinforced rubberized ply flipper. U.S. Pat. No. 5,221,385 discloses a tire having a bead core (bead), a bead filler (apex), and a rubber sheet. U.S. Pat. No. 3,163,683 discloses a tire bead assembly having a bead core, an apex and a gum tie strip of uncured rubber material. U.S. Pat. No. 4,319,943 discloses a prior art bead subassembly having bead filler portions on the top surfaces of material wings (sections of ply) axially spaced from the bead bundle annular side surfaces.

U.S. Pat. No. 6,972,061 discloses a method of building a green tire carcass by wrapping a ply having a pair of spaced preassembled inner apexes around a building drum. Then, a pair of beads with preassembled middle apexes are mounted circumferentially over the ply to a location axially outward from the inner apexes. Next, the middle section of the ply between the inner apexes is expanded radially outward to bring the inner apexes against the middle apexes. Preferably, the ply has a pair of preassembled outer apexes, each outwardly spaced from one of the inner apexes. Each of the beads is positioned with the preassembled middle apexes between corresponding inner and outer apexes. Next, the ply turnup portions of the ply are turned up to bring the outer apexes against the corresponding middle apexes. Preferably, the inner apexes and the outer apexes have a rectangular cross-section, and the middle apexes have a substantially triangular cross-section. The inner apexes extend radially outward further than the outer apexes and the middle apexes extend radially outward less than the outer apexes. The inner apexes, the middle apexes and the outer apexes are selected from a material of the group consisting essentially of green rubber, cured rubber, and combinations thereof.

U.S. Pat. No. 6,972,061 further discloses a pneumatic radial ply tire that comprises a tread, a belt structure, and a carcass. The carcass has a radial ply and two bead sections. The tire is characterized by each bead section having a bead and a compound apex with an inner apex and a middle apex. The compound apex preferably also has an outer apex. The inner apex and the outer apex have a substantially rectangular cross-section, and the middle apex has a substantially triangular cross-section. Preferably, the inner apex extends radially outward further than the outer apex and the middle apex extends radially outward less than the outer apex. The inner apex, the middle apex and the outer apex are each of a material selected from the group consisting essentially of green rubber, cured rubber and combinations thereof.

U.S. Pat. No. 8,973,637 describes a pneumatic tire having a triangular shaped apex which extends radially outward of the bead core, and wherein the apex is formed of at least two zones. Each zone is formed of a different material, wherein the first zone extends from the base of the apex to the tip of the apex, and the second zone is located adjacent the ply. The zones are preferably formed by extrusion to form one cohesive apex. The first zone is formed of a material having a G"IG' ratio in the range of about 0.155 to about 0.183. The second zone is formed of a material having a G"IG' ratio in the range of about 0.125 to about 0.133. This apex design is reported to be optimal with respect to lower the rolling resistance of the tire.

As previously noted, high-1,4-cis-polybutadiene rubber is also used in premium golf ball core compositions. It is desirable for golf balls to provide a high level of spin and control at the green while offering a high launch angle and a lower level of spin off of the tee. However, it has been recognized for years that those traits and normally inconsistent and that one normally had to be sacrificed to enhance the other. In any case, to attain better performance characteristics it is desirable to for the core of a golf ball to be as stiff as possible and to exhibit the lowest possible level of hysteresis.

In general, golf balls may be divided into two categories: solid and wound. The wound golf ball has been viewed as a premier ball given its soft feel and high spin rate. Wound golf balls typically include a solid or fluid-filled center surrounded by a tensioned elastomeric thread and a cover. Wound balls generally are more difficult and expensive to manufacture than solid golf balls. Solid golf balls include one-piece constructions, two-piece constructions comprised of an elastomeric-based core and a cover, and three-piece and multi-layer balls which typically have an elastomeric-based core, at least one intermediate layer, and a cover. The elastomer-based cores typically represent the greatest volume within the golf ball. One-piece balls are the simplest and least expensive to manufacture but do not offer the desired playing characteristics. Their performance typically relegates them to use as range balls. The two-piece construction offers improved playing characteristics while being relatively easy to manufacture.

The solid golf balls or cores of wound balls generally have an elastomeric-based core that is formed by compression molding with subsequent vulcanization. In the case of a one-piece ball, the entire ball is constructed by this process. Polybutadiene rubber having cis-microstructure content of at least about 90 percent is generally preferred for golf balls possessing the best balance between feel and distance. The polybutadiene polymer is generally formulated with a free radical coagent and a free radical source. The free radical coagent is most often a metal salt of an α,β-ethylenically unsaturated carboxylic acid. The free radical source is predominantly a peroxide or combinations of peroxides. The free radical coagent is believed to both homopolymerize as well as graft to the polybutadiene during the crosslinking reaction. During this process, a high modulus filler is created in situ with connection to the elastomeric matrix. The result is a compound with sufficient rigidity, resiliency, and durability for golf ball play.

The high cis 1,4-polybutadiene used in golf ball cores can be made utilizing any suitable catalyst system or initiator. For instance, the high cis 1,4-polybutadiene can be synthesized by the polymerization of 1,3-butadiene monomer utilizing a nickel based Zeigler-Natta catalyst system, a rare earth metal catalyst system (which includes cerium, lanthanum, praseodymium, neodymium or gadolinium), or an anionic initiator, such an alkyl lithium compound. In any case, the high cis 1,4-polybutadiene will typically have a cis-1,4-microstructure content of at least about 90 percent.

United States Patent Application Publication No. 2002/0137849 A1 is based upon the unexpected discovery that cis-1,4-polybutadiene that is synthesized utilizing organometallic catalyst systems has superior characteristics for utilization in solid golf ball cores if the polymerization is terminated utilizing a fatty alcohol of the structural formula ROH, wherein R represents an alkyl group containing from 2 to about 30 carbon atoms. This publication more specifically discloses to a golf ball which is comprised of a solid core and a resin cover, wherein the solid core is comprised of cis-1,4-polybutadiene rubber which is made by polymerizing 1,3-butadiene in the presence of an organometallic catalyst system wherein the polymerization is short-stopped with a fatty alcohol of the structural formula ROH, wherein R represents an alkyl group containing from 2 to about 30 carbon atoms. It also further discloses a rubber composition for a solid golf ball having excellent durability and rebound properties comprising: (a) cis-1,4-polybutadiene rubber, wherein said cis-1,4-polybutadiene rubber has a Mooney ML 1+4 viscosity of 30 to 90, wherein said cis-1,4-polybutadiene rubber has a cis-1,4 bond content of at least 95 percent, wherein cis-1,4-polybutadiene rubber is made by polymerizing 1,3-butadiene in the presence of organometallic catalyst system, wherein the polymerization is short-stopped by the addition of a fatty alcohol of the structural formula ROH, wherein R represents an alkyl group containing from 2 to about 30 carbon atoms.

U.S. Pat. No. 6,713,565 is based upon the discovered that cis-1,4-polybutadiene that is synthesized utilizing Zeigler-Natta catalyst systems has superior characteristics for utilization in solid golf ball cores if the polymerization is terminated utilizing a carboxylic acid of the structural formula RCOOH, wherein R represents an alkyl group containing from 1 to about 30 carbon atoms. U.S. Pat. No. 6,713,565 further reveals a rubber composition for a solid golf ball having excellent durability and rebound properties comprising: (a) cis-1,4-polybutadiene rubber, wherein said cis-1,4-polybutadiene rubber has a Mooney ML 1+4 viscosity of 30 to 90, wherein said cis-1,4-polybutadiene rubber has a cis-1,4 bond content of at least 95 percent, wherein cis-1,4-polybutadiene rubber is made by polymerizing 1,3-butadiene in the presence of organometallic catalyst system, wherein the polymerization is short-stopped by the addition of a carboxylic acid of the structural formula RCOOH, wherein R represents an alkyl group containing from 1 to about 30 carbon atoms. This patent also discloses the golf balls having a cis-1,4-polybtutadiene core which includes zinc acrylate and zinc oxide.

U.S. Pat. Nos. 4,056,269 and 4,264,075 disclosed a molded golf ball employing a filler-functioning cross-linking monomer comprising a polyvalent metal salt of an unsaturated acid. At sufficient levels of filler-functioning cross-linking monomer, the golf ball composition comprising cis-polybutadiene elastomer was reported to have good properties. However, it was also reported that the curing process generated an exotherm during the vulcanization step. The exotherm was reported to exceed the temperature of the mold by 60° C. This was reported to result in an internal temperature of 220° C.

The exotherm reported on curing the golf ball core composition is likely due to the expected exotherm that would be seen from the free radical initiated homopolymerization of the coagent in such a viscous medium as polybutadiene elastomer. As the internal temperature of the compound increases, the rate of decomposition of peroxide to free radicals also increases. Once decomposed, the oxygen-centered radical from the peroxide has the ability to both abstract a hydrogen radical from the polybutadiene or add to the double bond which is typically present in common peroxide coagents. As the flux of radicals in the system increases, the homopolymerization and grafting reactions also increase. This situation whereby the temperature increases the rate of an exothermic reaction which in turn continues to raise the temperature is classically termed a "runaway". It is speculated here that during this runaway time frame, the extent of cure experiences an asymptotic increase. The difficulty lies in the fact that to reach a necessary degree of crosslinking there needs to be a sufficient amount of polymerizable coagent as reported in U.S. Pat. Nos. 4,056,269 and 4,264,075. However, it was also reported that the exotherm generated during the curing step made the molding process more difficult. If a golf ball core is formulated with a lower level of polymerizable coagent, the resiliency and durability of the ball are compromised. However, the degree of exotherm found during the cure is less and the time for complete conversion of the peroxide is conversely much longer. By formulating a golf ball core with a sufficient amount of polymerizable coagent for reasonable golf ball performance, an exotherm is created which is sufficient to induce further decomposition of peroxide. The increase in decomposition of peroxide introduces more radicals and an increase in the homopolymerization and grafting reactions. The ability to control the exotherm by cooling is limited by the dimensions of the ball, which offer very little surface area to volume. The result is a rapid increase in crosslink density that may be above that necessary for reasonable golf ball play.

There have been several citations in the patent literature which disclose the addition of a chemical agent to augment the properties of a golf ball. The augmentation has typically involved a decrease in compression.

U.S. Pat. No. 4,852,884 discloses a golf ball which exhibits a high coefficient of restitution when a metallic dithiocarbamate is used at levels between 0.1 and 0.5 parts by weight based on 100 parts of a polybutadiene elastomer or mixtures thereof. No disclosure is made as to the mechanism of improvement from the dithiocarbamate.

U.S. Pat. No. 4,650,193 discloses the creation of a soft layer underneath the golf ball cover. This is accomplished by modifying the cure at the surface of a golf ball during the molding process. The modification occurs by exposing the surface to an agent that alters the cure. The only example and claim to a suitable agent is elemental powdered sulfur.

U.S. Pat. No. 5,252,652 first discloses the use of an organic sulfur compound and/or a metal salt thereof. The addition of said organic sulfur compound and/or a metal salt thereof to the rubber golf ball core composition produced a rubbery elastomer having improved rebound resilience after vulcanized. As a golf ball, the result produced by the compound is cited as an increase in initial velocity upon hitting and improved flying performance No disclosure is made as to the mechanism of improvement from the organic sulfur compound and/or metal salt thereof.

U.S. Pat. No. 6,184,301 discloses the use of a sulfur halide to impart a solid golf ball with a good degree of both deformation and resiliency. In the final golf ball, the results translate into improved flight distance while maintaining a good feel. No disclosure is made as to the mechanism of improvement from the sulfur halide.

U.S. Pat. Nos. 6,666,780 and 6,679,791 disclose the design of a multi-piece golf ball whereby there exists an optimized hardness profile in which the hardness gradually increases radially outward from the center toward the outside edge or surface of the core. This construction feature is said to provide improved rebound energy, travel distance, durability, and feel of the ball. The patents offer suitable compounding ingredients such as a thiophenol, thionaphthol, halogenated thiophenol or metal salt thereof in order to obtain said hardness gradient. No disclosure is made in either patent as to the mechanism of improvement from the suggested suitable compounding ingredients.

U.S. Pat. Nos. 6,162,135 and 6,291,592 disclose the use of a cis-to-trans catalyst to produce golf balls with lower compression and increased resilience. The cis-to-trans catalyst will isomerize a portion of the cis-polybutadiene to the trans-configuration yielding a greater trans-polybutadiene content after curing than was originally present. The cis-to-trans catalyst can be applied to the center, intermediate layer, or both, depending on the golf ball construction. The lower modulus and increased resilience is explained, without being bound to this particular theory, by the increased mobility of the polymer backbones as a result of the combination of cis- and trans-polybutadiene.

U.S. Pat. No. 6,635,716 discloses the use of a halogenated organosulfur compound or metal salt thereof to increase the coefficient of restitution ("COR") and/or decrease compression. The halogenated organosulfur compound is introduced at levels between 2.2 and 5.0 parts per hundred polybutadiene. No description is given as to the mechanism by which the halogenated organosulfur compound improves COR or decreases compression.

U.S. Pat. Nos. 5,697,856 and 6,287,218 discloses the use of an organosulfur compound in combination with polybutadiene rubber of 90% or greater cis content to affect an increase in the trans-polybutadiene content upon curing to between 10% and 30% for the first patent and 10% to 50% for the second. The presence of the organosulfur compound is reported to generate a gradient in crosslinking from the center of the core to the exterior. The resultant golf ball has a lower compression while maintaining or increasing resiliency.

United States Statutory Invention Registration Number H 2036 H discloses a golf ball which is comprised of a solid core and a resin cover, wherein the solid core is comprised of cis-1,4-polybutadiene rubber which is made by polymerizing 1,3-butadiene in the presence of (a) an organonickel compound, (b) an organoaluminum compound, (c) a fluorine containing compound and (d) para-styrenated diphenylamine; wherein the organoaluminum compound and the fluorine containing compound are brought together in the presence of the para-styrenated diphenylamine.

U.S. Pat. Nos. 5,711,723 and 5,776,012 disclose the construction of a three-piece golf ball wherein the core and shell regions have different hardness. The difference in hardness between core and shell is brought about by the placement of a crosslinking adjuster in the core composition. The construction is reported to provide improved flight distance and feel. The benefit of the organosulfur compound and metal-containing organosulfur compound is said to be a result of the accelerated mastication of the rubber, and the resulting enhancement of the rebound performance of the soft part of the core.

U.S. Pat. No. 5,919,101 discloses a three-piece golf ball wherein the core of the golf ball employs an organic sulfide compound. The invention is described to provide a golf ball with good shot feel while maintaining excellent flight performance and durability.

SUMMARY OF THE INVENTION

This invention is based upon the discovery that carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms, has much better interaction with $\alpha,\beta$-ethylenically unsaturated carboxylic acids, such as zinc diacrylate and zinc dimethacrylate. This results in such $\alpha,\beta$-ethylenically unsaturated carboxylic acids filled rubber composition being stiffer and exhibiting a lower level of hysteresis. These characteristics are beneficial when used in manufacturing tire apex compositions, in manufacturing golf ball cores, and in a wide variety of other applications. Such rubber compositions can be used as substitutes for thermoplastic elastomers in many applications.

High cis-1,4-polybutadiene rubber can be functionalized in accordance with this invention by grafting a functionalizing agent of the formula: HS-A-(COOH)$_n$, wherein A represents a hydrocarbyl group containing from 1 to 20 carbon atoms, wherein n represents an integer from 1 to 3, wherein the COOH groups can be bonded to a single carbon atom or to multiple carbon atoms in the hydrocarbyl group, onto the rubber. Such functionalizing agents will generally contain from 1 to 20 carbon atoms, and will typically contain from 3 to 8 carbon atoms. The functionalizing agent will also typically contain 1 or 2 carboxyl groups. For instance, the functionalizing agent can be a compound of the formula HS-A-COOH, or a compound of the formula: HS-A-(COOH)$_2$, wherein A represents a hydrocarbyl group containing from 1 to 20 carbon atoms. In any case, the functionalizing agent is a compound that contains both a thiol group and at least one carboxylic acid group.

The functionalization can typically be accomplished by simply blending the functionalizing agent into the rubber and allowing the grafting to occur at an elevated temperature, such as the temperature which is normally reached during rubber mixing in a Banbury mixer or a mill mixer. This functionalization of the high cis-1,4-polybutadiene rubber can be carried out by simply reacting the high cis-1,4-polybutadiene rubber having a cis-1,4-microstructure content of at least 90 percent rubber with the functionalizing agent.

The present invention is more specifically directed to a carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms.

The subject invention also reveals a high cis-1,4-polybutadiene rubber composition of high stiffness and which exhibits low hysteresis, said composition being comprised of (1) a carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms and (2) a metal salt of an $\alpha,\beta$-ethylenically unsaturated carboxylic acid. The metal salt of the $\alpha,\beta$-ethylenically unsaturated carboxylic acid will typically be a metal salt of acrylic acid, methacrylic acid, maleic acid, fumaric, acid ethacrylic acid, vinyl-acrylic acid, itaconic acid, methyl itaconic acid, aconitic acid, methyl aconitic acid, crotonic acid, $\alpha$-methylcrotonic acid, cinnamic acid, or 2,4-dihydroxy cinnamic acid. The metal will typically be zinc, cadmium, calcium, magnesium, sodium or aluminum with zinc, calcium, and aluminum salts being preferred. The metal salt of the $\alpha,\beta$-ethylenically unsaturated carboxylic acid will preferably be zinc diacrylate or zinc dimethacrylate with zinc diacrylate being preferred.

The present invention further discloses a tire which is comprised of a generally toroidal-shaped carcass with an outer circumferential tread, two spaced beads, two apexes, at least one ply extending from bead to bead, said ply including ply turnups which extends around the beads and the apexes, and sidewalls extending radially from and connecting said tread to said beads, wherein said circumferential tread is adapted to be ground-contacting, and wherein the apexes are comprised of a high cis-1,4-polybutadiene rubber composition which is comprised of (1) a carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms and (2) a metal salt of an $\alpha,\beta$-ethylenically unsaturated carboxylic acid.

The subject invention also reveals a pneumatic tire comprising a carcass, the carcass having one or more cord reinforced plies and a pair of bead portions, each bead portion having at least one annular inextensible bead core about which the cord reinforced plies are wrapped, a tread and a belt reinforcing structure disposed radially outward of the carcass, the bead portion further comprising an apex which extends radially outward of the bead core, wherein the apex is comprised of a high cis-1,4-polybutadiene rubber composition which is comprised of (1) a carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms and (2) a metal salt of an $\alpha,\beta$-ethylenically unsaturated carboxylic acid.

The present invention further discloses a golf ball which is comprised of a solid core and a resin cover wherein the core is produced by curing a carboxylic acid functionalized high cis-1,4-polybutadiene rubber composition which is comprised of (1) a polybutadiene rubber having polybutadiene rubber chains having a cis-1,4-microstructure content of at least 90 percent and which have pendant groups of the structural formula: —S-A-COOH, wherein A represents a hydrocarbyl group containing from 1 to 20 carbon atoms and (2) a metal salt of an $\alpha,\beta$-ethylenically unsaturated carboxylic acid with a peroxide curing agent.

The subject invention also reveals a process for manufacturing a golf ball core which comprises (1) blending a mixture of (i) a carboxylic acid functionalized high cis-1,4-polybutadiene rubber which is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms, (ii) a metal salt of an α,β-ethylenically unsaturated carboxylic acid, and (iii) a peroxide curing agent to produce a golf ball core composition, (2) compressing the golf ball core composition into an essentially spherical shape to produce an uncured golf ball core and (3) heating the uncured golf ball cure at an elevated temperature to produce a cured golf ball core. This method for manufacturing a golf ball will preferable further comprises encapsulating the cured golf ball core made by the process with a resin cover.

BRIEF DESCRIPTION OF THE DRAWING

FIG. 1 is a cross-sectional view of a golf ball of this invention having a solid core and a resin cover.

DETAILED DESCRIPTION OF THE INVENTION

High cis-1,4-polybutadiene rubber which can be functionalized in accordance with this invention is commercially available for a number of sources around the world. For example, it is commercially available from The Goodyear Tire & Rubber Company and is sold as Budene® 1207, Budene® 1208, and Budene® 1280 high cis-1,4-polybutadiene rubber. The high cis-1,4-polybutadiene rubber, it can be synthesized with a nickel based catalyst system in accordance with the teachings of U.S. Pat. No. 4,983,695. This method involves polymerizing 1,3-butadiene in a solution of an aliphatic and/or cycloaliphatic solvent system employing as a catalyst system a mixture of (1) an organonickel compound, (2) an organoaluminim compound and (3) a fluorine containing compound selected from the group consisting of hydrogen fluoride and hydrogen fluoride complexes prepared by complexing hydrogen fluoride with ketones, esters, ethers, alcohols, phenols and water, said polymerization being conducted in the presence of small amounts of an alpha olefin, such as ethylene or propylene. This technique more specifically involves synthesizing high cis-1,4-polybutadiene by polymerizing 1,3-butadiene in a solution of an aliphatic and/or cycloaliphatic solvent system employing as a catalyst system, a mixture of (1) a nickel salt of a carboxylic acid, (2) a trialkylaluminum compound, and (3) a fluorine containing compound prepared by complexing hydrogen fluoride with ethers; wherein the mole ratio of said trialkylaluminum compound to said nickel salt of a carboxylic acid ranges from about 0.3/1 to about 300/1, wherein the mole ratio of said fluorine containing compound to said nickel salt of a carboxylic acid ranges from about 0.5/1 to about 500/1, and wherein the mole ratio of the fluorine containing compound to the trialkylaluminum compound ranges from about 0.4/1 to about 15/1; said polymerization being conducted in the presence of 0.73 to 4.57 phm of propylene. A more detailed description of nickel based catalyst systems that can be used in the synthesis of high cis-1,4-polybutadiene rubber is provided in Canadian Patent 1,284,545. The teachings of Canadian Patent 1,284,545 and U.S. Pat. No. 4,983,695 are incorporated herein by reference for the purpose of disclosing such nickel based catalyst systems and their use in synthesizing high cis-1,4-polybutadiene rubber.

The high cis-1,4-polybutadiene rubber can also be synthesized utilizing the method described in U.S. Pat. No. 5,698,643. This method comprises polymerizing 1,3-butadiene monomer in a solution of hexane at a temperature of about 65° C. employing as a catalyst system, a mixture of (1) nickel octanoate, (2) triisobutylaluminum and (3) a hydrogen fluoride complex which is prepared by complexing hydrogen fluoride with dibutyl ether, wherein the mole ratio of said triisobutylaluminum to said nickel octanoate is about 40:1, wherein the mole ratio of the hydrogen fluoride complex to said nickel octanoate is about 105:1, and wherein the mole ratio of the hydrogen fluoride complex to the triisobutylaluminum is about 2.6:1, said polymerization being conducted in the presence of 2 to 15 phm of isobutene which acts as a molecular weight regulator to reduce the molecular weight of the high cis-1,4-polybutadiene.

The high cis-1,4-polybutadiene can also by synthesized in accordance with the teachings of U.S. Pat. No. 5,451,646. This method comprises polymerizing 1,3-butadiene in the presence of (a) an organonickel compound, (b) an organoaluminum compound, (c) a fluorine containing compound, and (d) para-styrenated diphenylamine; wherein the organoaluminum compound and the fluorine containing compound are brought together in the presence of the para-styrenated diphenylamine. The teaching of U.S. Pat. Nos. 4,983,695, 5,698,643 and 5,451,646 are incorporated herein by reference.

The high cis-1,4-polybutadiene can also by synthesized utilizing a rare earth metal catalyst system. For instance, the use of rare earth metal compounds as components of organometallic mixed catalyst systems for the stereospecific polymerization of 1,3-butadiene monomer into high cis-1, 4-polybutadiene is disclosed by U.S. Pat. No. 4,260,707. The catalyst system disclosed in U.S. Pat. No. 4,260,707 is comprised of (a) a reaction mixture formed by reacting a rare earth carboxylate and an aluminum compound wherein there are three hydrocarbon residues having from 1 to 20 carbon atoms attached to the aluminum, (b) a trialkyl aluminum and/or a dialkyl aluminum hydride and (c) a Lewis acid. An improved process for preparing conjugated diolefin polymers or copolymers having a high content of 1,4-cis-units and high chain linearity is disclosed in U.S. Pat. No. 4,444,903. In this process a catalytic system prepared from (a) at least one carboxylate or alcoholate of a rare earth element, (b) a tertiary organic halide and (c) an organo metallic aluminum compound not containing halide ions of the formula: $R_aR_bAlR_c$ in which $R_a$ and $R_b$ are alkyl residues and $R_c$ is hydrogen atom or an alkyl radical. Another example of the use of an organometallic mixed catalyst system containing a rare earth compound for producing a conjugated diene polymer is disclosed in U.S. Pat. No. 4,461,883. This process is characterized by polymerizing at least one conjugated diene with a catalyst consisting of (A) a reaction product of a Lewis base and a carboxylate of a rare earth element of the lanthanum series represented by $AlR_2R_3R_4$, wherein $R_2$, $R_3$, and $R_4$ which may be the same or different represent hydrogen or alkyl substituents, although $R_2$, $R_3$, and $R_4$ cannot all be hydrogen atoms and (C) an alkyl aluminum, and (D) optionally, a conjugated diene. The lanthanum based catalyst system can also be comprised of (1) a compound of a lanthanum series rare earth metal, (2) an organoaluminum compound, and (3) a halogen containing compound. The compounds of lanthanum series rare earth metal include carboxylates, alkoxides, thioalkoxides, halides, amides and the like of elements having an atomic number which is within the range of 57 to about 71, such as cerium, lanthanum, praseodymium, neodymium and gadolinium. Some representative examples of sources for the carboxylate, alkoxide or thioalkoxide octanoic acid, 2-ethylhexanoic acid, oleic acid, stearic acid, benzoic acid, naphthenic acid, 2-ethyl-hexylalcohol, oleyl alcohol, phenol, benzyl alcohol, thiophenol, and the like. In any case, the rare earth metal may be used alone or in a combination of two or more additional rare earth metals. In order to solubilize the compound of the lanthanum series rare earth element into a polymerization catalyst system, this compound may be used as a mixture or a reaction product with the Lewis base and/or Lewis acid, if necessary. Typically the use of a Lewis base is preferable. Some representative examples of Lewis bases that can be utilized include acetylacetone, tetrahydrofuran, pyridine, N,N'-dimethyl formamide, thiophene, diphenyl ether, triethylamine, organic phosphorus compound, mono- or bivalent alcohol and the like. The organoaluminum compound will typically be a trialkyl aluminum compound, such as triethyl aluminum, triisobutyl aluminum, triisopropyl aluminum, trihexyl aluminum and the like. Among them, triethyl aluminum, triisobutyl aluminum and trihexyl aluminum, and the like. The halogen containing compound will typically be a fluorine or a chlorine containing compound, such boron trifluoride, a hydrogen fluoride complex which is prepared by complexing hydrogen fluoride with dialkyl ether, or a halogenated aluminum compound. Such catalyst systems are described in greater detail in U.S. Pat. No. 4,533,711 the teachings of which are incorporated herein by references for the purpose of disclosing useful catalyst systems.

In any case the high cis-1,4-polybutadiene rubber which is functionalized in accordance with this invention can be characterized by being comprised of high cis-1,4-polybutadiene rubber having a cis-microstructure content of at least 90 percent. The high cis-1,4-polybutadiene rubber will typically have a cis-microstructure content of at least 94 percent and will more typically have a cis-microstructure content of at least 95 percent. In many cases the high cis-1,4-polybutadiene rubber will have a cis-microstructure content of at least 96 percent, at least 97 percent, or even as high as at least 98 percent.

High cis-1,4-polybutadiene rubber can be functionalized in accordance with this invention by grafting a compound of the formula: $HS-A-(COOH)_n$, wherein A represents a hydrocarbyl group containing from 1 to 20 carbon atoms, wherein n represents an integer from 1 to 3, wherein the COOH groups can be bonded to a single carbon atom or to multiple carbon atoms in the hydrocarbyl group, onto the rubber. Such functionalizing agents will generally contain from 1 to 20 carbon atoms, and will typically contain from 3 to 8 carbon atoms. The functionalizing agent will also typically contain 1 or 2 carboxyl groups. For instance, the functionalizing agent can be a compound of the formula HS-A-COOH, or a compound of the formula: $HS-A-(COOH)_2$, wherein A represents a hydrocarbyl group containing from 1 to 20 carbon atoms. In any case, the functionalizing agent is a compound that contains both a thiol group and at least one carboxylic acid group.

In any case, the functionalization can typically be accomplished by simply blending the functionalizing agent into the rubber and allowing the grafting to occur at an elevated temperature, such as the temperature which is normally reached during rubber mixing in a Banbury mixer or a mill mixer. In any case, this functionalization of the high cis-1, 4-polybutadiene rubber is carried out by reacting the high cis-1,4-polybutadiene rubber with a functionalizing agent of the formula: $HS-A-(COOH)_n$, wherein A represents a hydrocarbyl group containing from 1 to 20 carbon atoms, wherein n represents an integer from 1 to 3, wherein the COOH groups can be bonded to a single carbon atom or to multiple carbon atoms in the hydrocarbyl group. As previously noted the high cis-1,4-polybutadiene rubber is comprised of polybutadiene rubber chains having a cis-1,4-microstructure content of at least 90 percent. It is typically convenient to functionalize the high cis-1,4-polybutadiene rubber in an internal mixer simultaneously with mixing other rubber chemicals, fillers, reinforcing agents, and the like into the rubber formulation. In other words, it is not typically necessary to functionalize the high cis-1,4-polybutadiene rubber in a separate step.

As previously noted, the functionalizing agent will contain at least on thiol group and at least one carboxyl group. The functionalizing agent will normally be of the formula: HS-A-COOH or the formula: $HS-A-(COOH)_2$, wherein A represents a hydrocarbyl group containing from 1 to 20 carbon atoms. The hydrocarbyl group in the functionalizing agent will typically contain from 2 to 10 carbon atoms and will more typically contain from 3 to 8 carbon atoms. Mercaptopropionic acid, 1-mercaptobutanoic acid, 1-mercaptopentanoic acid, 1-mercaptohexanoic acid, 1-mercaptoheptanoic acid, 1-mercaptooctanioc acid and thiomalic acid are some representative examples of functionalizing agents that can be used. Mercaptopropionic acid and thiomalic acid are preferred functionalizing agents with thiomalic acid being most preferred. The functionalizing agent will typically be employed at a level which is within the range of about 0.1 phr to about 10 phr (parts by weight per 100 parts by weight of rubber). The functionalizing agent will more typically be employed at a level which is within the range of 0.2 phr to 8 phr and will normally be employed at a level which is within the range of 0.4 phr to 6 phr. It is normally preferred for the functionalizing agent to be employed at a level which is within the range of 0.6 phr to 4 phr and most preferred for the functionalizing agent to be employed at a level which is within the range of 0.8 phr to 2 phr.

As previously noted, rubber formulations containing the functionalized high cis-1,4-polybutadiene rubber of this invention and a metal salt of an α,β-ethylenically unsaturated carboxylic acid are stiff and exhibit a low level of hysteresis. Some representative examples of α,β-ethylenically unsaturated carboxylic acids that can be employed in such rubber formulations include, but are not limited to, metal salts of acrylic acid, methacrylic acid, maleic acid, fumaric, acid ethacrylic acid, vinyl-acrylic acid, itaconic acid, methyl itaconic acid, aconitic acid, methyl aconitic acid, crotonic acid, α-methylcrotonic acid, cinnamic acid, or 2,4-dihydroxy cinnamic acid. The metal of this salts will typically be zinc, cadmium, calcium, magnesium, sodium or aluminum with zinc, calcium, and aluminum salts being preferred, and with zinc salts being most preferred. The metal salt of the α,β-ethylenically unsaturated carboxylic acid will preferably be zinc diacrylate or zinc dimethacrylate with zinc diacrylate being most preferred.

The functionalized high cis-1,4-polybutadiene rubber compositions of this invention will normally be cured with a free radical curative system. A wide variety of peroxide compounds can be used in such free radical curative systems. For instance, productive rubber compositions can be made with peroxide curatives, such organic peroxides. Some representative examples of organic peroxides that can be employed include dicumyl peroxide, bis-(t-butyl peroxydiisopropyl benzene, t-butyl perbenzoate, di-t-butyl peroxide, 2,5-dimethyl-2,5-di-t-butylperoxyhexane, .α,α-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, 2,5-dimethylhexane-2,5-dihydroperoxide, di-t-butyl peroxide, and the like. Preferred organic peroxide curatives include α-α-bis(t-butylperoxy) diisopropylbenzene, dicumyl peroxide and di-t-butyl peroxide. Cure-effective amounts of organic peroxide for purposes of the present invention are typically are typically within the range of 2 phr to about 10 phr. Preferred levels of organic peroxides are from about 4 to about 6 phr. In one embodiment of this invention the peroxide curative system used will contain at least one peroxide compound, a crosslinking agent, and zinc oxide. Some representative examples of crosslinking agents which can be used include: pentaerythritol tetraacrylate, trimethylol trimethacrylate, and diallyl phthalate.

Tire Apex Applications

The rubber formulations of this invention can beneficially be used as the material for tire apexes because they offer high stiffness and a low level of hysteresis. This ultimately results in a tire having better performance characteristics and a lower level of rolling resistance which equates to better fuel economy. In any case, FIGS. 1A and 1B illustrate conventional tires of the prior art and show an apex within the bead area of the tire. The apex of such tires can be comprised of the zinc diacrylate containing functionalized high cis-1,4-polybutadiene rubber formulations of this invention.

FIG. 1A shows a meridional cross-section of a typical conventional radial ply tire 100, comprising a tread 110, a belt structure ("belts") 112 comprising one or more belts, and a carcass 114. The carcass 114 has an innerliner 116, at least one radial ply 118, two sidewalls 120A,120B, and two identical bead sections 130A,130B.

FIG. 1B shows a cross-section of the bead section 130A of FIG. 1A. The reference numbers match those of FIG. 1A. It should be understood that the construction of the bead section 130B (not shown) is the same as that of the bead section 130A. The bead section 130A includes a bead 132 comprised of a bundle of wound steel filament in a rubber matrix. The ply 118 is wrapped around the bead, forming a ply inner section 118A and a ply turnup 118B. An apex 134 of rubber is surrounded by the bead 132, the ply inner section 118A and the ply turnup 118B. A more detailed description of tire apex structures and methods of building apex structures into tires is provided by U.S. Pat. No. 6,972,061. The teachings of U.S. Pat. No. 6,972,061 are incorporated herein by reference.

A pneumatic tire having a triangular shaped apex which includes at least two zones and which extends radially outward of the bead core of the tire is described in U.S. Pat. No. 8,973,637. In this design each zone of the apex is formed of a different material, wherein the first zone extends from the base of the apex to the tip of the apex, and the second zone is located adjacent the ply. The zones are preferably formed by extrusion to form one cohesive apex. The first zone is formed of a material having a G"IG ratio in the range of about 0.155 to about 0.183. The second zone is formed of a material having a G"IG' ratio in the range of about 0.125 to about 0.133. The functionalized high cis-1,4-polybutadiene rubber formulations of this invention can be employed in one of more zone of apexes of such a design. The teachings of U.S. Pat. No. 8,973,637 are incorporated herein by reference for the purpose of teaching apex designs into which the functionalized high cis-1,4-polybutadiene rubber formulation of this invention can be incorporated.

In the tire apexes of this invention zinc diacrylate will typically be present in the rubber formulation at a level which is within the range of about 5 phr to about 100 phr. The zinc diacrylate will more typically be present at a level which is within the range of 10 phr to 80 phr and will normally be present at a level which is within the range of 15 phr to 60 phr. Zinc diacrylate will preferably be present in the tire apex formulations of this invention at a level which is within the range of 20 phr to 40 phr.

Additional rubbery polymers can optionally be incorporated into the rubber formulations of this invention. Some representative examples of additional rubbers that may be used include acrylonitrile/diene copolymers, natural rubber, halogenated butyl rubber, butyl rubber, cis-1,4-polyisoprene, styrene-butadiene copolymers, styrene-isoprene-butadiene terpolymers, ethylene-propylene rubbers (EPR), ethylene/propylene/diene monomer rubbers (EPDM), and in particular ethylene/propylene/dicyclopentadiene terpolymers. Mixtures of the above rubbers may be used. Each rubber layer may be comprised of the same rubber composition or alternating layers may be of different rubber composition.

The rubber compound may contain a platy filler. Representative examples of platy fillers include talc, clay, mica and mixture thereof. When used, the amount of platy filler ranges from about 25 to 150 parts per 100 parts by weight of rubber (hereinafter referred to as phr). Preferably, the level of platy filler in the rubber compound ranges from about 30 to about 75 phr.

The various rubber compositions may be compounded with conventional rubber compounding ingredients. Conventional ingredients commonly used include carbon black, silica, coupling agents, tackifier resins, processing aids, antioxidants, antiozonants, stearic acid, activators, waxes, oils, sulfur vulcanizing agents and peptizing agents. As known to those skilled in the art, depending on the desired degree of abrasion resistance, and other properties, certain additives mentioned above are commonly used in conventional amounts. Typical additions of carbon black comprise from about 10 to 150 parts by weight of rubber, preferably 50 to 100 phr. Typical amounts of silica range from 10 to 250 parts by weight, preferably 30 to 80 parts by weight and blends of silica and carbon black are also included. Typical amounts of tackifier resins comprise from about 2 to 10 phr. Typical amounts of processing aids comprise 1 to 5 phr. Typical amounts of antioxidants comprise 1 to 10 phr. Typical amounts of antiozonants comprise 1 to 10 phr. Typical amounts of stearic acid comprise 0.50 to about 3 phr. Typical amounts of waxes comprise 1 to 5 phr. Typical amounts of oils comprise 2 to 30 phr. Typical amounts of peptizers comprise from about 0.1 to 1 phr.

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

The apex formulation of this invention can be pre-cured before being built into a green tire. Such a pre-curing step is frequently desired in cases where the apex formulations of this invention are cured with standard peroxide curative system in accordance with this invention. In other words, an apex of the desired geometry which is comprised of a cured rubber formulation of this invention can be build into a green tire which is subsequently vulcanized with a conventional sulfur curative system.

Golf Ball Core Applications

The elastomeric core and potential intermediate layers of golf balls may beneficially be made with the functionalized high cis-1,4-polybutadiene rubber compositions of this invention. In addition to the functionalized high cis-1,4-polybutadiene rubber, the resilient portion of the golf ball may also contain additional rubbers, such as styrene-butadiene rubber, natural rubber, synthetic polyisoprene rubber, styrene-isoprene rubber, and the like. The amount of such additional rubbers that can be included in the resilient portion of the golf ball will normally be no more than about 60 phr (parts per 100 parts by weight of rubber), based upon the total amount of rubber included in the resilient portion of the golf ball. Thus, the resilient portion of the golf ball will normally contain from about 40 phr to 100 phr of the functionalized high cis-1,4-polybutadiene and from 0 phr to about 60 phr of such additional rubbers. It is normally preferred for such additional rubbers to be present in the resilient portion of the golf ball at a level of no more than about 30 phr. It is normally more preferred for such additional rubbers to be present in the resilient portion of the golf ball at a level of no more than about 15 phr. In many cases, it is preferred for the functionalized high cis-1,4-polybutadiene rubber to be the only elastomer in the core of the golf ball.

The co-crosslinking agent used in the resilient portion of the golf ball will typically be an unsaturated carboxylic acid or a metal salt thereof. For example, the co-crosslinking agent can be acrylic acid, methacrylic acid, zinc acrylate, zinc methacrylate or a mixture thereof. The co-crosslinking agent will typically be present in the rubbery component of the golf ball at a level which is within the range of about 15 phr to about 60 phr. The co-crosslinking agent will typically be present in the resilient portion of the golf ball at a level which is within the range of about 25 phr to about 40 phr.

The peroxide used in the resilient portion of the golf ball will typically be an organic peroxide, such as dicumyl peroxide, t-butylperoxybenzoate or di-t-butylperoxide. It is normally preferred to use dicumyl peroxide in such golf ball compounds. The peroxide will typically be present in the rubbery component of the golf ball at a level which is within the range of about 0.5 phr to about 3 phr. The peroxide will preferably be present in the rubbery component of the golf ball at a level that is within the range of about 1 phr to about 2.5 phr.

Solid golf balls generally include a core and a resin cover. Such a golf ball 1 is illustrated in FIG. 1 wherein the golf ball 1 has a solid core 2 and a resin cover 3. The solid golf ball design may include a core obtained by one piece molding or be of a multi-piece design where one or more layers are coated onto the core. In any case, such solid golf balls of this invention include a resilient portion obtained by curing the functionalized high cis-1,4-polybutadiene rubber containing composition which also includes a co-crosslinking agent, a peroxide, and zinc diacrylate.

Golf balls normally have a diameter that is within the range of about 41.15 mm to about 42.67 mm. To meet standardized weight requirements, the resilient portion of the golf ball will also typically contain a filler. Some representative examples of fillers that can be used include barium sulfate, zinc oxide, calcium carbonate, silica, and the like. Antidegradants can also be included in the rubbery component of the golf ball to protect it from degradation.

The rubber compound for the resilient portion of the golf ball can be prepared by mixing the functionalized high cis-1,4-polybutadiene rubber, the co-crosslinking agent, the peroxide, the optional filler and any other optional materials by conventional mixing techniques, such as by means of a roller or a kneader. The mixing will normally be carried out for about 10 to about 30 minutes, preferably about 15 to about 25 minutes, at a temperature of 50° C. to 140° C., preferably 70° C. to 120° C.

The solid golf ball can be a one-piece solid golf ball, a two-piece solid golf ball or a multi-piece solid golf ball. The one-piece solid golf ball can be prepared by vulcanizing the rubber compound through one piece molding. The two-piece and multi-piece solid golf balls normally include a solid core which is comprised of the resilient rubbery compound and a resin cover. In the case of multi-piece solid golf balls, the solid core is composed of a center core which is comprised of the resilient rubbery compound and one or more outer layers coated thereon. At least a portion of the solid core is prepared by vulcanizing the rubber composition of the present invention. The vulcanization will be conducted at a temperature which is within the range of about 140° C. to 170° C. for about 20 minutes to about 40 minutes. The resin cover is one typically comprised of an ionomer resin or a mixture of ionomer resins. Suitable ionomer resins are commercially available from the Mitsui Polychemical Company under the trade names Himilan® 1707, Himilan® 1706 and Himilan® 1605.

In accordance with this invention a golf ball core can be manufactured by (1) blending a mixture of the functionalized high cis-1,4-polybutadiene, a metal salt of an α,β-ethylenically unsaturated carboxylic acid, a free radical curative, and optionally a crosslinking agent to produce a golf ball core composition, (2) compressing the golf ball core composition into an essentially spherical shape to produce an uncured golf ball core and (3) heating the uncured golf ball cure at an elevated temperature to produce a cured golf ball core.

The practice of this invention is further illustrated by the following examples which are intended to be representative rather than restrictive of the scope of the subject invention. Unless indicated otherwise, all parts and percentages are given by weight.

Example I

In this example, four rubber compounds were prepared under two slightly different mixing protocols. Rubber Samples A through D were first prepared in a non-productive mixing stage by mixing in a 70 cc Haake PolyLab mixer with intermeshing rotors, 100 parts of Budene 1207G® high-cis 1,4-polybutadiene rubber and 10 parts of zinc oxide. Experimental samples additionally incorporated 1 part of thiomalic acid. Mixing conditions include all zone temperatures set at 130° C. and rotor speeds at 130 rpm. Samples A and B were mixed for approximately 2.5 minutes after the ingredients were loaded which produced a final temperature of 162° C. Samples C and D were alternatively mixed for 3 minutes after a temperature of 150° C. was reached.

TABLE 1

| | Parts by Weight (phr) | | | |
|---|---|---|---|---|
| | | | Heat Treatment | |
| Material | Cntrl A | Exp B | Cntrl C | Exp D |
| Non-Productive Mix Step (NP) | | | | |
| Cis 1,4-polybutadiene rubber | 100 | 100 | 100 | 100 |
| Zinc Oxide | 10 | 10 | 10 | 10 |
| Thiomalic Acid[1] | | 1 | | 1 |
| Productive Mix Step (PR) | | | | |
| Zinc Diacrylate[2] | 25 | 25 | 25 | 25 |
| Stearic Acid[3] | 3 | 3 | 3 | 3 |
| Dicumyl Peroxide[4] | 1 | 1 | 1 | 1 |

[1]Aldrich: Mercaptosuccinic acid, 97%
[2]Total Petrochemicals & Refining USA, Inc. (Cray Valley Division): Dymalink® 633
[3]Vantage Oleochemicals: VSTEARIN™ SA29 Rubber Grade Stearic Acid
[4]Aldrich: Dicumyl Peroxide, 98%

In a second productive mixing stage, all the compounds were mixed with the remaining ingredients (zinc diacrylate and dicumyl peroxide) again in the 70 cc mixer with all temperature zones set at 60° C. and rotor speed set at 60 rpms. Mixing was conducted for 3 minutes after incorporation of all the ingredients and resulted in a final compound temperature of approximately 75° C.

From each of the four samples created in this example, a 5 gram portion of each finished compound mix was tested on a Rubber Process Analyzer 2000. The sample was exposed to a cure cycle at a temperature of 160° C., oscillatory frequency of 1.667 Hz, at an arc of 3.5%. While still in the instrument, the sample was then put through an oscillatory shear strain sweep to determine storage and loss moduli. The strain sweeps were conducted at a temperature of 40° C. and a frequency of 1 Hz and included 10% strain.

As reported in Table 2, the presence of thiomalic acid in compounds B and D decreased the torque experienced during cure (S') while also significantly decreasing the loss modulus (G"). This is unanticipated as a decreased torque during cure would be expected to produce a less cured network and a material with a higher loss modulus.

TABLE 2

| | Cntrl A | Exp B | Cntrl C | Exp D |
|---|---|---|---|---|
| Cure Performance | | | | |
| S' @ Max S' (MH) dNm | 185.0 | 138.3 | 181.7 | 150.2 |
| Time @ 90% cure S' (min) | 24.2 | 28.4 | 24.1 | 28.1 |
| RPA Testing | | | | |
| G' @ 10% MPa | 8.7 | 7.7 | 8.5 | 8.7 |
| G" @ 10% MPa | 1.1 | 0.85 | 1.1 | 0.75 |
| Tand @ 10% | 0.125 | 0.110 | 0.124 | 0.086 |

Example 2

In this example, four rubber compositions were prepared with a single control and experimental samples of varying levels of thiomalic acid. Samples E through H were prepared in the same way as the previous samples which involved a first non-productive mix in a 70 cc Haake PolyLab mixer with intermeshing rotors and 100 parts of Budene 1207G® high-cis 1,4-polybutadiene rubber and 10 pts of zinc oxide. The three experimental samples additionally incorporated variable levels of thiomalic acid. Mixing conditions included all zone temperatures set at 120° C. and rotor speeds at 100 rpm. Samples E through H were mixed for 3 minutes after all the ingredients were loaded into the mixer and the ram was seated in the down position. Mixing was stopped after completion of the 3 minutes mix segment and the material removed from the mixer with all samples possessing a temperature of approximately 160° C. All the productive mixes were mixed under the same conditions: all zone temperature zones set at 40° C., rotor speed set at 50 rpms, mix time of 3 minutes with an approximate final temperature of 75° C.

TABLE 3

| | Parts by Weight (phr) | | | |
|---|---|---|---|---|
| Material | Cntrl E | Exp F | Exp G | Exp H |
| Non-Productive Mix Step (NP) | | | | |
| Cis 1,4-polybutadiene rubber | 100 | 100 | 100 | 100 |
| Zinc Oxide | 10 | 10 | 10 | 10 |
| Thiomalic Acid[1] | 0 | 0.5 | 1.0 | 1.5 |
| Productive Mix Step (PR) | | | | |
| Zinc Diacrylate[2] | 25 | 25 | 25 | 25 |
| Dicumyl Peroxide[4] | 1 | 1 | 1 | 1 |

From each of the samples created in this example, a 5 gram portion of each finished compound mix was tested on a Rubber Process Analyzer 2000. The sample was exposed to a cure cycle at a temperature of 160° C., oscillatory frequency of 1.667 Hz, at an arc of 3.5%. While still in the instrument, the sample was then put through an oscillatory shear strain sweep to determine storage and loss moduli. The strain sweeps were conducted at a temperature of 40° C. and a frequency of 1 Hz and included 10% strain.

TABLE 4

| | Cntrl E | Exp F | Exp G | ExpH |
|---|---|---|---|---|
| Cure Performance | | | | |
| S' @ Max S' (MH) dNm | 159.9 | 158.5 | 146.6 | 146.3 |
| Time @ 90% cure S' (min) | 22.3 | 23.1 | 23.2 | 22.4 |
| RPA Testing | 9.6 | 9.6 | 9.6 | 8.7 |
| G' @ 10% MPa | | | | |
| G" @ 10% MPa | 1.3 | 1.2 | 1.2 | 1.0 |
| Tand @ 10% | 0.135 | 0.127 | 0.126 | 0.110 |

Example 3

In this example, two rubber compositions were prepared with a single experimental containing thiomalic acid. These samples were prepared in much the same way as previously described although at a larger scale. A first non-productive mix was made in a Kobe 1.5 Liter internal mixer with intermeshing rotors and 100 parts of Budene 1207G® high-cis 1,4-polybutadiene rubber and 10 pts of zinc oxide. The experimental sample additionally incorporated 1 part of thiomalic acid. Mixing was performed at an initial rotor speed of 130 rpm until the mixture reached 150° C., at which point the rotor speed was reduced in order to maintain the temperature while mixing continued for an additional 3 minutes. The productive mixes were then performed for the two samples with the mixing stage materials being added to the same Kobe mixer previously described. The productive mix procedure included mixing at 35 rpm for 3 minutes after all the ingredients were loaded into the mixer and the ram was seated in the down position. The ram was raised as needed to maintain a temperature of 75° C. for both samples.

TABLE 5

| | Parts by Weight (phr) | |
|---|---|---|
| Material | Cntrl I | Exp J |
| Non-Productive Mix Step (NP) | | |
| Cis 1,4-polybutadiene rubber | 100 | 100 |
| Zinc Oxide | 10 | 10 |
| Thiomalic Acid[1] | 0 | 1 |
| Productive Mix Step (PR) | | |
| Zinc Diacrylate[2] | 25 | 25 |
| Dicumyl Peroxide[4] | 1 | 1 |

After completion of the two mixing stages, the compounds were milled to a thickness of ⅛ inch and cut into strips of approximately 1.5 inch width. These strips were combined or cut to produce a mass of 36 grams. These strips were then rolled tightly to reduce entrapped air to produce a cylinder of 1.5 inch height. A mold with several spherical cavities was employed to produce analogous golf ball cores. The mold assembly possessed a top and bottom portion that consists of symmetrical hemispherical cavities and features to ensure proper alignment of both segments of the mold as well as a single channel into one of the cavities that permits temperature monitoring through a thermocouple. The mold was placed in a heated press at 160° C. and allowed to equilibrate. After equilibration, the mold was opened and the rubber compound sample placed in the bottom portion of the mold, the top was mounted, and the assembly was returned to the press. Temperature at the center of a representative ball was measured and the cure was stopped at 30 seconds beyond the completion of the exotherm. Subsequently, the mold was removed from the press and the balls removed from the mold.

Balls were cross-sectioned for the purpose of evaluating the material properties via nanoindentation across the diameter of the balls. Cross-sectioned samples were embedded in slow-set epoxy and fine polished to 1200 grit. Nano-indentation analyses were performed on a NanoIndenter G200 (MTS) fitted with a 100 micron flat punch operating the "G XP CSM FPCM_2_Frq_SFA200_STFC25_FCC0p012_MC30p" method. Analysis was conducted with 30 indents per location beginning at the center of the ball and stepping out radially along a center-line in ¼ inch steps. Storage modulus (E'), loss modulus (E") and loss factor (Tan D) were measured at a frequency of 45 Hz at a strain <1%.

The storage modulus (E') profiles showed a similar trend regardless of whether they were a control or experimental formulation—the higher modulus values were observed at the periphery and lesser values through the center of the core. Interestingly, the cores produced from a compound employing thiomalic acid had a much more even modulus profile relative to the control balls. This smaller difference found with the experimental balls was largely due to a higher modulus at the center. In particular, the loss modulus at the center is considerably lower than the control balls not employing thiomalic acid.

TABLE 6

| | Cntrl 1 | Cntrl 2 | Exp 1 | Exp 2 |
|---|---|---|---|---|
| Golf Ball Nanoindentation | | | | |
| Average E' at periphery | 29.05 | 27.36 | 26.05 | 27.88 |
| E' at center | 16.30 | 15.90 | 18.25 | 20.06 |
| E' difference (periphery - center) | 12.75 | 11.46 | 7.83 | 7.82 |
| Golf Ball Nanoindentation | | | | |
| Average E" at periphery | 1.63 | 1.61 | 1.09 | 1.02 |
| E" at center | 1.06 | 1.22 | 0.68 | 0.76 |

While certain representative embodiments and details have been shown for the purpose of illustrating the subject invention, it will be apparent to those skilled in this art that various changes and modifications can be made therein without departing from the scope of the subject invention.

What is claimed is:

1. A golf ball which is comprised of a solid core and a resin cover wherein the core is produced by curing a carboxylic acid functionalized high cis-1,4-polybutadiene rubber composition with a peroxide curing agent, wherein the carboxylic acid functionalized high cis-1,4-polybutadiene rubber is comprised of polybutadiene rubber chains having a cis-1,4-microstructure content of at least 90 percent and which have pendant groups of the structural formula: —S-A-COOH, wherein A represents a hydrocarbyl group containing from 1 to 20 carbon atoms, and a metal salt of an α,β-ethylenically unsaturated carboxylic acid, wherein the metal is selected from the group consisting of zinc, cadmium, calcium, magnesium, sodium, and aluminum, and wherein the peroxide curing agent is utilized at a level which is within the range of 0.1 phr to 3 phr.

2. The golf ball as specified in claim 1 wherein A represents a hydrocarbyl group containing from 2 to 10 carbon atoms.

3. The golf ball as specified in claim 1 wherein A represents a hydrocarbyl group containing from 3 to 8 carbon atoms.

4. The golf ball as specified in claim 1 wherein the α,β-ethylenically unsaturated carboxylic acid is zinc diacrylate, and wherein the zinc diacrylate is present in the rubber formulation at a level which is within the range of 5 phr to 60 phr.

5. The golf ball as specified in claim 4 wherein the zinc diacrylate is present in the rubber formulation at a level which is within the range of 15 phr to 45 phr.

6. The golf ball as specified in claim 1 wherein the metal salt of the α,β-ethylenically unsaturated carboxylic acid is a metal salt of a member selected from the group consisting of acrylic acid, methacrylic acid, maleic acid, fumaric, acid ethacrylic acid, vinyl-acrylic acid, itaconic acid, methyl itaconic acid, aconitic acid, methyl aconitic acid, crotonic acid, α-methylcrotonic acid, cinnamic acid, and 2,4-dihydroxy cinnamic acid.

7. The high cis-1,4-polybutadiene rubber composition golf ball as specified in claim 1 wherein the metal is selected from the group consisting of with zinc, calcium, and aluminum.

8. The golf ball as specified in claim 1 wherein the metal is zinc.

9. The golf ball as specified in claim 1 wherein said core is further comprised of a filler selected from the group consisting of barium sulfate, zinc oxide, calcium carbonate and silica.

10. The golf ball as specified in claim 9 wherein the peroxide curing agent is utilized at a level which is within the range of 0.75 phr to 2 phr.

11. The golf ball as specified in claim 9 wherein the core is further comprised of thiomalic acid.

12. The golf ball as specified in claim 11 wherein the thiomalic acid is present at a level of 1 phr.

13. The golf ball as specified in claim 11 wherein the core is further comprised of zinc oxide.

14. The golf ball as specified in claim 13 wherein the zinc oxide is present at a level of 10 phr.

15. The golf ball as specified in claim 1 wherein the carboxylic acid functionalized high cis-1,4-polybutadiene rubber has a cis-microstructure content of at least 96 percent.

16. The golf ball as specified in claim 1 wherein the carboxylic acid functionalized high cis-1,4-polybutadiene rubber has a cis-microstructure content of at least 98 percent.

17. The golf ball as specified in claim 1 wherein the resin cover is of an ionomer resin.

18. The golf ball as specified in claim 17 wherein the golf ball is a two-piece solid golf ball.

19. The golf ball as specified in claim 1 wherein the core consists essentially of the cured carboxylic acid functionalized high cis-1,4-polybutadiene rubber, the metal salt of the $\alpha,\beta$-ethylenically unsaturated carboxylic acid, the peroxide curing agent, and optionally additional rubbers.

20. The golf ball as specified in claim 19 wherein if the additional rubbers are present, they are selected from the group consisting of styrene-butadiene rubber, natural rubber, synthetic polyisoprene rubber, and styrene-isoprene rubber.

* * * * *